United States Patent [19]

Cioca et al.

[11] 4,327,195

[45] Apr. 27, 1982

[54] POLYURETHANE CONTAINING POLYPEPTIDES

[75] Inventors: Gheorghe Cioca, Belleville; Paul A. Fertell, Wilmington, both of N.J.

[73] Assignee: Seton Company, Newark, N.J.

[21] Appl. No.: 191,863

[22] Filed: Sep. 29, 1980

[51] Int. Cl.$^3$ ............................................. C08G 18/14
[52] U.S. Cl. ...................................... 521/102; 521/163
[58] Field of Search .................... 521/102, 163; 260/6, 260/7.5

[56] References Cited

U.S. PATENT DOCUMENTS

| | | | |
|---|---|---|---|
| 2,763,624 | 9/1956 | Newell | 521/102 |
| 3,663,472 | 5/1972 | Raymond | 260/6 |
| 4,098,645 | 7/1978 | Hartdegen et al. | 260/6 |
| 4,246,360 | 1/1981 | Brown et al. | 521/102 |

*Primary Examiner*—Maurice J. Welsh
*Attorney, Agent, or Firm*—Webb, Burden, Robinson & Webb

[57] ABSTRACT

A polyurethane is comprised of the reaction product of a polyisocyanate and a polyreactive hydrogen compound having a polypeptide admixed therewith.

8 Claims, No Drawings

POLYURETHANE CONTAINING POLYPEPTIDES

BACKGROUND OF THE INVENTION

1. Field of the Invention

This invention relates to polyurethanes and more particularly to polyurethanes having polypeptides admixed therewith.

2. Description of the Prior Art

Polyurethanes have found broad utility in coatings, foams and the like because of their excellent chemical and physical properties. Polyurethanes are typically the reaction products of an isocyanate and a polyreactive hydrogen compound such as a polyhydroxy compound or a polyamine. Further, polyurethanes may also contain urea linkages in addition to the urethane linkages due to the reaction of the isocyanate group with water or amines. Polyurethanes have enjoyed this extensive use because of the variety of materials that can be used as the reactive hydrogen compound.

More particularly, polyurethanes may be fabricated into two general types of foams, flexible foams and rigid foams. The flexible foams are elastomeric in nature and must possess properties suitable to provide cushioning and the like; whereas, rigid polyurethanes are used for structural and insulating purposes.

In the formation of polyurethane foams, fillers may be added which not only can reduce the cost of the final polyurethane, but also enhance the final desired properties of the polyurethane product. These fillers are typically inorganic fillers such as silica, barium sulfate and similar known filling materials.

In accordance with the present invention, a filler material for polyurethane and more particularly, polyurethane foam is provided which enhances the properties of the final polyurethane product.

BRIEF DESCRIPTION OF THE INVENTION

A polyurethane is comprised of the reaction product of a polyisocyanate and a polyreactive hydrogen compound having a polypeptide admixed therewith. "Polypeptide" as used herein means and refers to polypeptides derived from collagen having a molecular weight of at least 500 and includes native collagen, animal fibers, leather fibers, tanned leather trim, chrome shavings and oligopeptides which are hydrolysis products of collagen having a molecular weight between 500 and 30,000. Chrome shavings are the most preferred filler useful in the practice of the invention.

The polyurethanes useful in the practice of the invention are those which are based upon polyisocyanates i.e., isocyanates having a functionality of two or greater. Typical isocyanates useful in forming the polyurethanes in accordance with the invention are toluene diisocyanate, metaphenylene diisocyanate; biphenylene-4, 4'-diisocyanate; methylene bis (4-phenyl isocyanate); 4-chloro-1, 3-phenylene diisocyanate; naphthalene-1, 5-diisocyanate; tetramethylene-1, 4-diisocyanate; hexamethylene-1, 6-diisocyanate; decamethylene-1, 10-diisocyanate; cyclohexylene-1, 4-diisocyanate; methylene bis(4-cyclohexyl diisocyanate); tetrahydronaphthylene diisocyanate; isophorone diisocyanate and the like, and their dimers and trimers where they exist.

The polyreactive hydrogen compounds useful in the practice of the invention are those having reactive hydrogens in a functionality of two or greater. These reactive hydrogens are those which are reactive with isocyanate groups and include the polyester diols and triols; the polyether diols and triols; diamines; water and the like. These reactive hydrogen compounds are well known to those skilled in the art.

The equivalent ratios of isocyanate to polyreactive hydrogen compound to polyisocyanate are those which are art recognized.

The polypeptides useful in the practice of the invention are those having a molecular weight of 500 or greater and preferably 2,000 or greater and include natural insoluble collagen, regenerated collagen, animal fibers, leather fibers, tanned leather trim, chrome shavings and oligopeptides. "Natural insoluble collagen" means and refers to collagen which cannot be dissolved in an aqueous alkaline or in an inorganic salt solution without chemical modification and includes hides, splits, and other mammalian or reptilian coverings. More particularly, "natural insoluble collagen" means and refers to the corium which is the intermediate layer of a bovine hide between the grain and flesh sides. Oligopeptides which are derived from collagen are those which are produced from collagen from the hydrolysis or enzymatic digestion of the natural insoluble collagen. The animal fibers are those which are obtained from the hides of animals and are untreated to prevent putrefaction. The leather fibers are dervied from animal hides which have been treated to prevent putrefaction. The tanned trim and shavings include chrome shavings and additionally include trim and shavings from tanning processes other than chrome tanning.

The chrome shavings which are one of the most preferred materials useful in the practice of the invention normally contain a large amount of water i.e. about 50%. Therefore, it is necessary to dry these chrome shavings to a predetermined moisture content since excess residual moisture will react with the isocyanate component of the urethane and may render the final product undesirable. Chrome shavings, when dried to their equilibrium states, contain about 6 to 12% by weight water although they may be dried to lower moisture levels. Upon exposure to the atmosphere, the chrome shavings will equilibrate to the 6 to 12% water. Chrome shavings having 6 to 12% water of equilibrium are used in the practice of the invention.

Although it is not fully understood, it is known that polypeptides derived from collagen possess various pendant functional groups along the peptide chains. These functional groups include hydroxyl, carboxyl, thio, amine and the like. While it is known that these functional groups, per se, are reactive with isocyanates, it is not known that the functional groups in chrome shavings react with the isocyanate due to possible steric hindrance of the remaining polypeptides preventing reaction with the isocyanate. Likewise, it is not known whether the water of equilibrium present in chrome shavings reacts with the isocyanate or if it is sufficiently bound within the protein structure to make it unavailable for reaction with the isocyanate. To the contrary, the oligopeptides are known to have functional groups available for reaction.

In addition to the polyreactive hydrogen compound, the isocyanate and the polypeptide, additional materials may be used in order to form the polyurethane. For example, catalysts such as the tin catalysts and amine catalysts may be used to promote the reaction of the polyreactive hydrogen compound, the isocyanate and the polypeptide if it participates. Typical tin catalysts are stannous octoate and dibutyl tin dilaurate. The amine catalysts are well known to those skilled in the art.

In preparing the polyurethanes in accordance with the invention, the polyisocyanate or an isocyanate terminated prepolymer thereof, is mixed with a polyreactive hydrogen compound and the polypeptide. In selecting the stoichiometry for reaction with the isocyanate, the reactivity of the polyreactive hydrogen compound is usually governing, and the additional functionality of the polypeptide and water contained in chrome shavings does not have to be taken into account as polyreactive hydrogen compound.

Thus the polyreactive hydrogen compound, the isocyanate, the polypeptide, and any other necessary ingredients are mixed together and allowed to coreact to form the polyurethanes of the invention.

In an alternative procedure when the polypeptide is soluble in organic solvents, the polypeptide is dissolved in the solvent and added to the polyol side of the reaction mixture. A further alternative procedure is the addition of the polypeptide to the isocyanate side of the reaction mixture.

When a polyurethane foam filled with a polypeptide is to be prepared in accordance with the invention, a chemical blowing agent may be added which releases a gas due to the chemical decomposition of such blowing agent as a consequence of the heat of reaction or the raising of the reactants' temperature by an outside heat source. Further, water may be used as a blowing agent because upon reaction of water with the isocyanate, carbon dioxide is released.

Further, the foams prepared in accordance with the invention may be mechanically frothed or an inert gas such as Freon or the like may be introduced into the reactant mixture.

It has been found that the use of polypeptides derived from collagen provide desirable properties to polyurethanes and particularly polyurethane foams. For example, when oligopeptides having a molecular weight of approximately 20,000 produced by hydrolyzing collagen are included in the polyurethane foam, they have been found to increase the water absorption i.e. hydrophilicity of the foam. Further when polypeptides are incoroporated into polyurethane foams which are useful for cushioning and the like, it has been found that there is an improvement in the memory or compression set over prolonged use of the foam.

The polypeptides are used at a level of up to 100 parts by weight per 100 parts of combined weight of polyreactive hydrogen compound and polyisocyanate and preferably up to 20 parts by weight per 100 parts of combined weight of polyreactive hydrogen compound and polyisocyanate. In the case of foams, greater than 20 parts by weight per 100 parts of polyurethane, produces a friable product.

The polypeptides useful in the practice of the invention may be incorporated into the polyreactive hydrogen compound polyisocyanate system either by dispersing solid polypeptide in particulate form in the system or by dissolving soluble polypeptides in a strong solvent, such as dimethyl sulfoxide or dimethyl formamide and adding the polypeptides as a solution. It is to be understood that natural insoluble collagen, chrome shavings and similarly non-refined polypeptides must be added as a solid since they are insoluble even in strong solvents whereas oligopeptides of lower molecular weight which have been processed to produce a soluble product can be dissolved in such strong solvents and incorporated into the polyurethane. When the polypeptides are used as a solid particulate material, it is preferred that the particle size be less than 0.5 millimeter. In the case of soluble polypeptides, for example, those having a molecular weight under 30,000, the preferred particle size range is also below about 0.5 millimeter. For example, chrome shavings having a particle size of 0.1 to 0.5 millimeter may be used to prepare a suitable polyurethane composite and particularly flexible foam.

The following examples are illustrative of polyurethanes prepared in accordance with the invention.

EXAMPLE I

A polyurethane elastomeric celluar foam was prepared according to the following formulation:

| Ingredient | Amount (parts by weight) |
|---|---|
| Polyol poly(oxyethylene)glycol M.W. 3,000, Hydroyl No. 56 | 100 |
| Non-hydrolyzable silicone surface active agent | 1.0 |
| Stannous octoate (catalyst) | 0.75 |
| Dimethylaminoethyl ether (catalyst) | 0.15 |
| Water (blowing agent) | 4.2 |
| Toluene diisocyanate | 53.2 |
| Oligopeptide (molecular weight 20,000 prepared by the hydrolysis of bovine collagen: particle size up to 0.5 mm | 7.9 |

The oligopeptide was dispersed in the polyol to form a homogeneous slurry. The remaining ingredients in the formulation were charged to a suitable vessel and mixed at high speed and poured into a closed mold and the foam was allowed to cure.

EXAMPLE II

Example I was repeated except that 15.9 parts of the oligopeptide of Example I was used in the formulation.

EXAMPLE III

Example I was repeated except that 23.8 parts of the oligopeptide of Example I was used in the formulation.

Testing of the flexible urethane foams prepared in accordance with Examples I through III demonstrated improved compression set characteristics over the formulation having no oligopeptide therein.

EXAMPLE IV

Example I was repeated except that chrome tanned collagen fibers in the form of chrome shavings having a particle size of 0.1 to 0.5 millimeter were substituted for the oligopeptide of Example I.

EXAMPLE V

Example IV was repeated except that 15.9 parts of chrome shavings were used in the formulation.

EXAMPLE VI

Example IV was repeated except that 23.85 parts of chrome shavings were used in the formulation. In this Example VI there was somewhat non-uniform distribution of the collagen material in the final foam; however, the foam exhibited good flexibility and excellent compression set characteristics.

In all of Examples IV through VI which used chrome shavings in the formulation, the final flexible foam product exhibited excellent compression set characteristics over unfilled elastomeric foams of the same formulation.

EXAMPLE VII

Example I was repeated except that native collagen fiber was substituted for the oligopeptide in Example I. The native collagen fiber was prepared from the bovine corium and was free of fat and processing salts. The native collagen fiber in accordance with this Example VII had a particle size of 0.1 to 0.5 millimeter.

EXAMPLE VIII

Example VII was repeated except that 15.9 parts of native collagen fiber was substituted in the formulation.

EXAMPLE IX

Example VII was repeated except that 23.85 parts of native collagen fiber was substituted in the formulation. In this Example the final foam article had a uniform distribution of collagen fiber, but exhibited flexibility and excellent compression set characteristics.

In all of Examples VII, VIII and IX the final foam products have improved compression set characteristics over the same formulation without a polypeptide of any kind.

Thus in accordance with the present invention, polyurethanes and specifically polyurethane foams can be prepared with improved properties using polypeptides in various forms, particularly those derived from collagen and including hydrolyzed collagen in the form of polypeptide in a molecular weight range of greater than 6,000 and preferably 2,000 to 30,000, untanned tannery waste which have been processed to provide native collagen fiber, and tanned products such as chrome shavings.

In addition to the improved physical properties of the polyurethanes, it has been found that particularly chrome shavings improve the fire retardant characteristics of the polyurethane.

Although the invention has been described with reference to specific materials and specific processes, the invention is only to be limited so far as is set forth in the accompanying claims.

We claim:

1. In a composition including polyurethane foam, prepared by the reaction of a polyreactive hydrogen compound and a polyisocyanate the improvement comprising a particulate polypeptide derived from collagen incorporated into said composition.

2. The composition of claim 1 wherein the polypeptide is an oligopeptide.

3. The composition of claim 1 wherein the polypeptide is native collagen.

4. The composition of claim 1 wherein the polypeptide is leather fibers.

5. The composition of claim 4 wherein the polypeptide is chrome shavings.

6. The composition of claim 1 wherein the polyurethane foam is flexible.

7. The composition of claim 1 wherein the polypeptide is present at a level of up to 100 parts by weight per 100 parts of polyurethane.

8. The composition of claim 7 wherein the polypeptide is present at a level of up to 20 parts by weight per 100 parts of polyurethane.

* * * * *